United States Patent
Rehman

(10) Patent No.: US 7,416,597 B2
(45) Date of Patent: Aug. 26, 2008

(54) SELF-DISPERSED PIGMENT INK FORMULATIONS, INK-JET INK SETS, PRINT SYSTEMS, AND METHODS OF PRINTING

(75) Inventor: Zia Ur Rehman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 10/889,751

(22) Filed: Jul. 13, 2004

(65) Prior Publication Data

US 2007/0234931 A1 Oct. 11, 2007

(51) Int. Cl.
*C09D 11/02* (2006.01)
(52) U.S. Cl. .................... 106/31.89; 106/31.86
(58) Field of Classification Search ............... 106/31.86
See application file for complete search history.

(56) References Cited

U.S. PATENT DOCUMENTS

| 5,302,197 | A |   | 4/1994  | Wickramanayke et al. |
|-----------|---|---|---------|----------------------|
| 5,342,440 | A |   | 8/1994  | Wickramanayake et al. |
| 5,531,817 | A |   | 7/1996  | Shields et al. |
| 5,656,071 | A |   | 8/1997  | Kappele et al. |
| 5,700,315 | A |   | 12/1997 | Wenzel |
| 5,700,317 | A | * | 12/1997 | Adamic ............ 106/31.58 |
| 5,853,465 | A |   | 12/1998 | Tsang et al. |
| 6,013,124 | A |   | 1/2000  | Saibara et al. |
| 6,015,206 | A |   | 1/2000  | Heydinger et al. |
| 6,086,198 | A |   | 7/2000  | Shields et al. |
| 6,214,100 | B1 |  | 4/2001  | Prazak et al. |
| 6,221,142 | B1 |  | 4/2001  | Wang et al. |
| 6,471,758 | B1 |  | 10/2002 | Kelderman et al. |
| 6,475,271 | B2 |  | 11/2002 | Lin |
| 6,530,656 | B1 |  | 3/2003  | Teraoka et al. |
| 6,538,049 | B1 |  | 3/2003  | Kappele et al. |
| 2003/0079651 | A1 | | 5/2003 | Rehman |
| 2004/0168608 | A1 | * | 9/2004 | Bauer et al. ............ 106/31.27 |

FOREIGN PATENT DOCUMENTS

| EP | 0 778 325 A | 6/1997 |
| EP | 0 803 553 A | 10/1997 |
| JP | 63111090 | 5/1988 |
| JP | 4211475 | 8/1992 |
| JP | 4332773 | 11/1992 |
| JP | 2002226739 | 8/2002 |

* cited by examiner

*Primary Examiner*—Jerry Lorengo
*Assistant Examiner*—Veronica Faison Gee

(57) ABSTRACT

Self-dispersed pigment ink formulations, ink-jet ink sets, printer systems, and methods of printing, are disclosed. One exemplary self-dispersed pigment ink formulation, among others, includes a self-dispersed pigment, a surface-active compound, a solvent, and an aqueous solution. The surface-active compound includes hydrophobic moieties and hydrophilic moieties, where the hydrophobic moieties are from about 25 to 75% and the hydrophilic moieties are from about 25 to 75%.

22 Claims, 1 Drawing Sheet

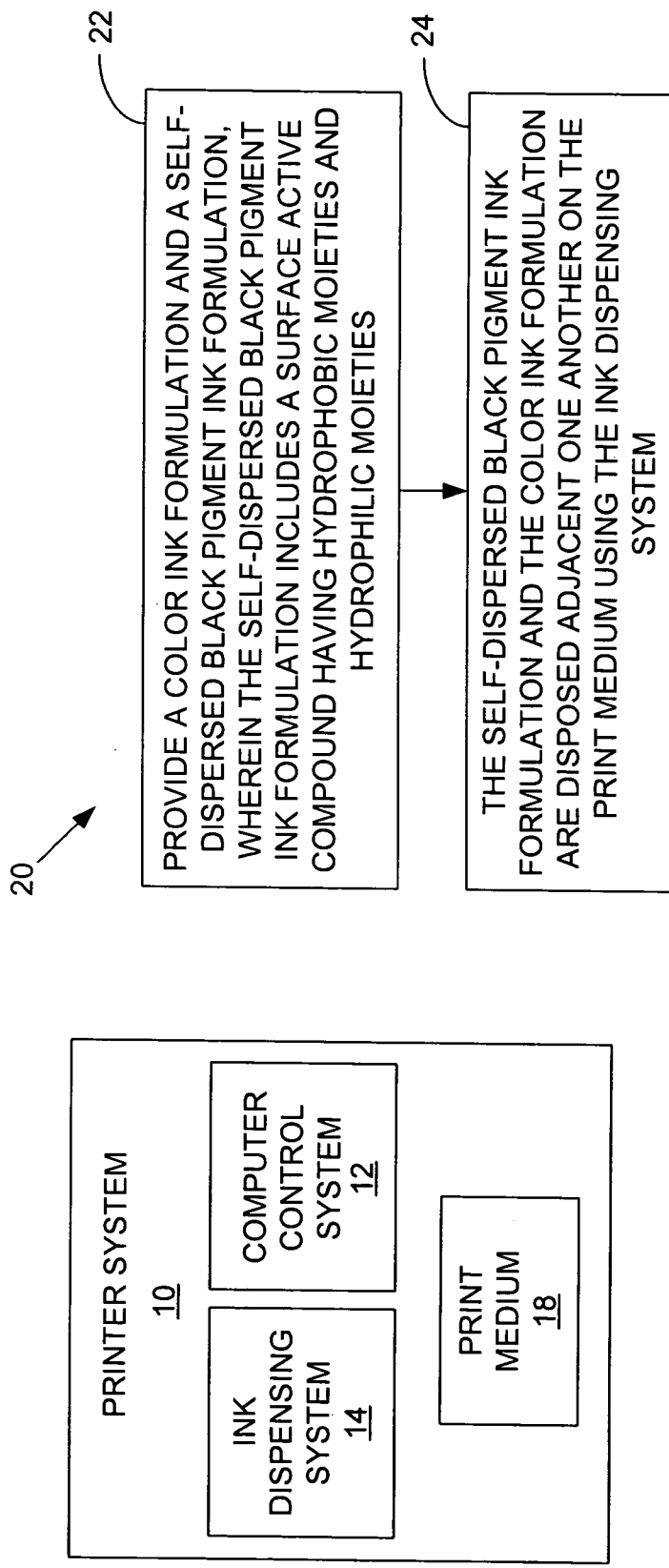

SELF-DISPERSED PIGMENT INK FORMULATIONS, INK-JET INK SETS, PRINT SYSTEMS, AND METHODS OF PRINTING

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images because this property still falls short of the permanence produced by other printing and photographic techniques. A continued demand in inkjet printing has resulted in the need to produce images of high quality, high permanence, and high durability, while maintaining a reasonable cost.

In inkjet printing, the inkjet image is formed on a print medium when a precise pattern of dots is ejected from a drop-generating device known as a printhead. The typical inkjet printhead has an array of precisely formed nozzles located on a nozzle plate and attached to an inkjet printhead array. The inkjet printhead array incorporates an array of firing chambers that receive liquid ink, which includes pigment-based inks and/or dye-based inks dissolved or dispersed in a liquid vehicle, through fluid communication with one or more ink reservoirs. Each chamber has a thin-film resistor, known as a firing resistor, located opposite the nozzle so ink can collect between the firing resistor and the nozzle. Upon energizing of a particular firing resistor, a droplet of ink is expelled through the nozzle toward the print medium to produce the image.

Print media have different surface energies. In addition, the surface energies are not uniform on the same print medium. Non-coated plain paper print media have paper fibers, fillers, and wet strength resins, and various sizing, all of which have a different amount of affinity for water-based inks. The surfaces of the print medium are mostly hydrophilic on areas where fibers and fillers are exposed and are hydrophobic in areas where wet strength resins are exposed. In general, print media have more hydrophilic sites than the hydrophobic sites on paper. This causes the inkjet drop to experience different interfacial surface energies not only from print medium to print medium but also on the same print medium.

With self-dispersed pigment inks, conventional approaches to ink design with a solvent, surfactant, and water do not work because they do not provide enough energy configurations to pacify the print medium to make it uniform.

SUMMARY

Briefly described, embodiments of this disclosure include self-dispersed pigment ink formulations, ink-jet ink sets, printer systems, and methods of printing. One exemplary self-dispersed pigment ink formulation, among others, includes a self-dispersed pigment, a surface-active compound, a solvent, and an aqueous solution. The surface-active compound includes hydrophobic moieties and hydrophilic moieties, where the hydrophobic moieties are from about 25 to 75% and the hydrophilic moieties are from about 25 to 75%.

Another exemplary self-dispersed pigment ink formulation, among others, includes a self-dispersed black pigment, a propoxylated glycerol, a solvent, and an aqueous solution. The propoxylated glycerol has the formula:

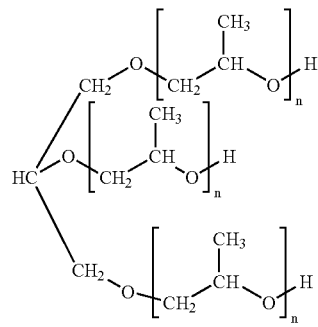

wherein n is from 1 to 40.

An exemplary ink-jet ink set, among others, includes a color ink formulation and a self dispersed black pigment formulation. The self-dispersed black pigment formulation includes a self-dispersed black pigment, a surface-active compound, a solvent, and an aqueous solution. The surface-active compound has hydrophobic moieties and hydrophilic moieties, where the hydrophobic moieties are from about 25 to 75% and the hydrophilic moieties are from about 25 to 75%.

An exemplary method of controlling black to color bleed, among others, includes providing a color ink formulation and a self-dispersed black pigment ink formulation as described above and printing the color ink formulation and the self-dispersed black pigment ink formulation adjacent one another, where the bleed from the color ink formulation and the self-dispersed black pigment ink formulation is substantially arrested.

An exemplary printer system, among others, includes a dispensing system including at least one printhead, where the printhead includes at least one of a self-dispersed black pigment and a color ink. The self-dispersed black pigment includes a self-dispersed black pigment, a surface-active compound, a solvent, and an aqueous solution. The surface-active compound has hydrophobic moieties and hydrophilic moieties, where the hydrophobic moieties are from 25 to 75% and the hydrophilic moieties are from 25 to 75%.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIG. 1 illustrates an embodiment of a printer system.

FIG. 2 illustrates a flow diagram of a representative embodiment for dispensing ink using the printer system of FIG. 1.

DETAILED DESCRIPTION

Self-dispersed pigment ink formulations, ink-jet ink sets, printer systems, and methods of printing, are described. Embodiments of the present disclosure substantially arrest black to color bleed by using a surface-active compound having hydrophobic and hydrophilic moieties within the self-dispersed pigment ink formulation. Although not intending to be bound by theory, once dispensed, the moieties of the surface-active compound pacify the surface energy of the print medium, which substantially arrests the black to color bleed and provide a print of uniform density.

In particular, an ink system having predominantly hydrophilic moieties will generally spread on the print medium causing bleed blotting, edge raggedness, and non-uniform prints. Embodiments of the self-dispersed pigment ink formulation include the surface-active compound that includes hydrophobic and hydrophilic moieties. Although not intending to be bound by theory, the hydrophilic moiety interacts with the hydrophilic surface areas of the print medium thereby pacifying them. To prevent lateral spread the remaining hydrophobic moiety forms a screen, which does not allow the ink to spread. In addition or in the alternative, the surface-active compounds attach to the self-dispersed pigment ink of the self-dispersed pigment ink formulation, which substantially immobilize the self-dispersed pigment ink on the print medium and/or forms an emulsion that entraps the self-dispersed pigment ink on the print medium.

FIG. 1 illustrates a block diagram of a representative printer system 10 that includes a computer control system 12, an ink dispensing system 14, and a print medium 18. The computer control system 12 includes a process control system that is operative to control the ink dispensing system 14. In particular, the computer control system 12 instructs and controls the ink dispensing system 14 to print characters, symbols, photos, etc. onto the print medium 18.

The ink dispensing system 14 includes, but is not limited to, ink-jet technologies and coating technologies, which dispense the ink (e.g., dye-based ink and pigment-based ink formulations) onto the print medium 18. Ink-jet technology, such as drop-on-demand and continuous flow ink-jet technologies, can be used to dispense the ink. The ink dispensing system 14 can include at least one ink-jet printhead system (e.g., thermal ink-jet printhead and/or a piezo ink-jet print head) operative to dispense (e.g., jet) the inks through one or more of a plurality of nozzles in a printhead. The printhead system incorporates an array of firing chambers that receive the ink (e.g., a black self-dispersed pigment ink formulation and color ink formulation) dissolved or dispersed in a liquid vehicle, which are in fluid communication with one or more ink reservoirs.

The self-dispersed pigment ink formulation includes, but is not limited to, a self-dispersed pigment, a surface-active compound, a solvent, and an aqueous solution. In addition, the self-dispersed pigment ink formulation can include salts, buffers, biocides, binders, and combinations thereof.

The term "print media" or "print medium" can include, but is not limited to, a paper substrate, a photobase substrate, a plastic media (e.g., clear to opaque plastic film) substrate, and the like. The print media may include, but is not limited to, a hard or flexible material made from a polymer, a paper, a glass, a ceramic, a woven cloth, or a non-woven cloth material.

The self-dispersed pigment inks include, but are not limited to, self-dispersed black pigment inks. The self-dispersed black pigment inks include, but are not limited to, chemically modified water-dispersible pigments such as self-dispersed carbon black. These chemical modifications impart water-dispersiblity to the self-dispersed black pigment ink precursors that encompass organic pigments. For example, self-dispersed carbon blacks include oxidized carbon blacks, surface modified carbon blacks, and a combination of oxidized and surface modified carbon blacks.

For self-dispersibility or water solubility, the pigments can be modified by the addition of one or more organic groups such as, but not limited to, at least one aromatic group or a $C_1$-$C_{12}$ alkyl group and at least one ionic group or ionizable group. The ionizable group is one that forms its ionic groups in the aqueous medium. The ionic group may be anionic or cationic. The aromatic groups can be substituted or unsubstituted. Examples of aromatic groups include phenyl or napthyl groups, the ionic group can include, but is not limited to, sulfanilic acid, sulfinic acid, phosphonic acid, carboxylic acid, ammonium, quaternary ammonium, or a phosphonium group.

Depending on the process selected, the self-dispersed black pigment ink can either be anionic or cationic in character. As commercially available, the anionic chromophores are usually associated with sodium or potassium cations, and the cationic chromophores are usually associated with chloride or sulfate anions.

One method of forming the self-dispersed black pigment ink includes treating the self-dispersed black pigment ink precursor with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid, and metanilic acid.

Ammonium, quaternary ammonium groups, quaternary phosphonium groups, and protonated amine groups represent examples of cationic groups that can be attached to the same organic groups discussed above.

Self-dispersed black pigment inks and methods of attaching functionalized groups are described in U.S. Pat. Nos. 5,707,432; 5,630,868; 5,571,311; and 5,554,739, all of which are incorporated herein by reference.

The following self-dispersed black pigments are useful in the practice of this disclosure; however, this listing is merely illustrative and not intended to limit the disclosure. The following self-dispersed black pigment inks are available from Cabot: Cab-O-Jet™ 200, and Cab-O-Jet™ 300. The following black pigments are available from Columbian: Raven 7000, Raven 5750, Raven 5250, Raven 5000, and Raven 3500. The following black pigments are available from Degussa: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex™ U, Printex™ 140U, Printex™ V, and Printex™ 140V. Tipure™. R-101 is available from DuPont.

The surface-active compound includes, but is not limited to, compounds having hydrophobic moieties and hydrophilic moieties. The surface-active compound can include hydrophobic moieties from about 25 to 75% and from 45 to 60%. The surface-active compound can include hydrophilic moieties are from 25 to 75% and from 40 to 55%. The surface-active compound can include, but is not limited to, propoxylated glycerols having the following formula, where "n" can be from about 1 to 200, about 1 to 40, about from 2 to 15, and about from 5 to 10.

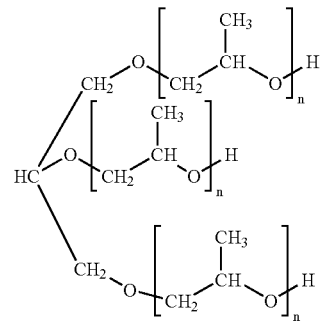

The surface-active compound can include, but is not limited to, propoxylated glycerols having molecular weight from about 200 to 35000, from 400 to 10000, and from 600 to 1500. The surface-active compound can include glycerol propoxylate (MW 1500), glycerol propoxylate (MW 1000), glycerol propoxylate (MW 750), glycerol propoxylate (MW 4100), and combinations thereof.

In addition, the surface-active compound can include, but is not limited to, propoxylated fatty acids, propoxylated alchohols, ethoxylated fatty acids, ethoxylated alcohols, alkyl phenols, and combinations thereof. In particular, the surface-active compound can include, Antarox™ AA-60, Antarox™ L62, Alcodet™ IL-3500, Antarox™ BL, Antarox™ LA-EP, and Antarox™ LF-224, all of which can be purchased from Rhone-Poulenc Inc.

In general and not intending to be bound by theory, propoxylated glycerols, being part hydrophobic, act as hydrophobic screens to prevent the lateral spread of inks. The hydrophilic moiety interacts with the hydrophilic surface areas of the print medium thereby pacifying them. Propoxylated glycerols are not only branched, but also have three large lobes where hydrophobic moieties are present. Each hydrophobic lobe has a relatively small hydrophilic hydroxl group attached on one side. The other side is part hydrophilic and part hydrophobic and is attached to all the three lobes.

The solvent can include, but is not limited to, water soluble organic solvents. The water soluble organic solvents can include, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol; 2-methyl 2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2 hexanediol; 1,2 octainediol; 2,5 dimethyl-3-hexyne 2,5 diol; trimethylol propane, 3-hexnye-2,5-diol; sulfolane; 3-pyridyl carbinol; and other pyrridine derivatives. In addition, the solvents can be added to reduce the rate of evaporation of water in the ink-jet to minimize clogging or other properties of the ink such as viscosity, pH, surface tension, optical density, and print quality.

The salt can include, but is not limited to, ammonium, potassium, or lithium benzoate salts; ammonium, potassium, or lithium acetates; lithium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartarate, malonate, fumarate, malate, sebacate, laurate, glutarate, acetate, oxylate, adipicate, pimelicate, subericate, azelaicate, and mixtures thereof.

Various buffers or pH adjusting agents can also be optionally used in the ink formulation. The buffering agent can include, but are not limited to, hydroxides of alkali metals and amines (e.g., lithium hydroxide, sodium hydroxide, potassium hydroxide, and citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form).

Various biocides can be used to inhibit growth of undesirable microorganisms. The biocides can include, but are not limited to, benzoate salts, sorbate salts, commercial products such as NUOSEPT™ (Nudex, Inc., a division of Huls America), UCARCIDE™ (Union Carbide), VANCIDE (RT Vanderbilt Co.), and PROXEL™ (ICI Americas), and other biocides.

Various surfactants can be used in the ink formulation. The surfactant can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toluene; xylene; cumenesulfonate; lignosulfonates; petroleum sulfonates; N-acyl-n-alkyltaurates; paraffin sulfonates; secondary n-alkanesulfonates; alpha olefin sufonates; sulfo-succnic esters; alkyl naphalene sulfonates; isethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylprrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines and sultaines surfactants.

In addition, binders can be included in the ink formulation, which act to secure the ink on the print medium. The binders can include, but are not limited to, compounds having molecular weight (MW) of from about 200 MW to about 10000 MW. The binders can include, but are not limited to, polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

In one embodiment, the self-dispersed pigment ink formulation can include an amount of the self-dispersed pigment from about 0.5 to 6 weight percent of the formulation, an amount of surface-active compound from about 0.01 to 3 weight percent of the formulation, an amount of solvent from about 10 to 35 weight percent of the formulation, while the remaining portion of the formulation is water. In another embodiment, the self-dispersed pigment ink formulation can include an amount of the self-dispersed pigment from about 0.5 to 6 weight percent of the formulation, an amount of surface-active compound from about 0.01 to 1 weight percent of the formulation, an amount of solvent from about 10 to 35 weight percent of the formulation, while the remaining portion of the formulation is typically water. It should also be noted that the self-dispersed black pigment ink formulation could include other components.

In another embodiment, the self-dispersed pigment ink formulation can include an amount of the self-dispersed black pigment from about 1 to 6 weight percent of the formulation, an amount of surface-active compound from about 0.01 to 0.2 weight percent of the formulation, an amount of ethoxylated glycerol from about 0.1 to 4.5 weight percent of the formulation, an amount of 2-pyrrolidinone from about 0.1 to 10 weight percent of the formulation, an amount of 1,5-pentanediol from about 0.1 to 10 weight percent of the formulation, an amount of 2-methyl-1,3-propanediol from about 0.1 to 2.0 weight percent of the formulation, an amount of Surfynol 465 from about 0.001 to 0.3 weight percent of the formulation, an amount of 2-methyl 2,4-pentanediol from about 0.1 to 5 weight percent of the formulation, an amount of ammonium benzoate from about 0 to 2.5 weight percent of the formulation, an amount of potassium acetate from about 0 to 1.5 weight percent of the formulation, an amount of ammonium acetate from about 0 to 2.0 weight percent of the formulation, an amount of ammonium sulfate from about 0 to 2.0 weight percent of the formulation, an amount of TRIS buffer from about 0 to 0.3 weight percent of the formulation, and an amount of Proxel GXL from about 0 to 0.1 weight percent of the formulation, while the remaining portion of the formulation is typically water.

The self-dispersed pigment ink formulation can be used in conjunction with one or more color inks in an ink-jet ink set in a printer system 10. The self-dispersed pigment ink formulation and the one or more color inks can be used in the same printhead or in one or more printheads.

For example, FIG. 2 illustrates a flow diagram of a representative embodiment for a method 20 dispensing ink using the printer system of FIG. 1. In block 22, a color ink formulation and a self-dispersed black pigment ink formulation are provided. The self-dispersed black pigment ink formulation includes a surface-active compound having hydrophobic moieties and hydrophilic moieties, as described above. In block 24, the self-dispersed black pigment ink formulation and the color ink formulation are disposed adjacent one another on the print medium 18 using the ink dispensing system 14.

The color ink can include, but is not limited to, dye-based inks and pigment-based inks. The dye-based inks and pigment-based inks may be nonionic, cationic, anionic, or mixtures thereof. Color dye-based inks and pigment-based inks for use in ink-jet printing may be employed in the practice of this disclosure. The color inks can include a large number of water-soluble acid and direct dyes. For the purposes of clarification only, and not for limitation, some exemplary colorants suitable for this purpose are set forth below.

Specific examples of such dyes include the Pro-Jet series of dyes available from Avecia Ltd., including Pro-Jet Yellow I Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Carolina Color and Chemical), Direct Blue 86, (Mobay Chemical), Reactive Red 4, Aldrich Chemical), Reactive Red 56, Pylam, Inc., Levafix Brilliant Red E-4B (Mobay Chemical), Levafix Brilliant Red E-6BA (Mobay Chemical), Pylam Certified D&C Red #28 (Pylam), Direct Brill Pink B Ground Crude (Crompton & Knowles), Cartasol Yellow GTF Presscake (Sandoz, Inc.), Tartrazine Extra Conc. (Sandoz, Inc.), Direct Yellow 86, Carolina Color and Chemical, Cartasol Yellow GTF Liquid Special 110 (Sandoz, Inc.), D&C Yellow #10 (Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is intended to be merely exemplary, and should not be considered limiting.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

What is claimed is:

1. A self-dispersed pigment ink formulation, comprising:
   a self-dispersed pigment;
   a surface-active compound having hydrophobic moieties and hydrophilic moieties, wherein the hydrophobic moieties are from about 25 to 75% and the hydrophilic moieties are from about 25 to 75%;
   a solvent; and
   an aqueous solution.

2. The self-dispersed pigment ink formulation of claim 1, wherein the surface-active compound includes a propoxylated glycerol having the formula:

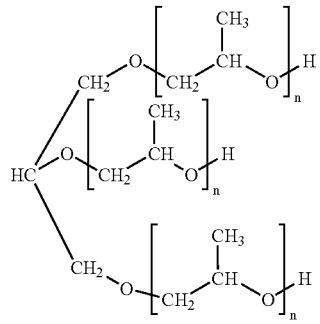

wherein n is from 1 to 200.

3. The self-dispersed pigment ink formulation of claim 1, wherein the self-dispersed pigment is in an amount form about 0.5 to 6 weight percent of the self-dispersed pigment ink formulation; the solvent is in an amount from about 10 to 35 weight percent of the self-dispersed pigment ink formulation; the surface-active compound is in an amount from about 0.01 to 3 weight percent of the self-dispersed pigment ink formulation; and the aqueous solution is in an amount from about 45 to 90 weight percent of the self-dispersed pigment ink formulation.

4. The self-dispersed pigment ink formulation of claim 1, wherein the self-dispersed pigment is selected from an oxidized carbon black, a surface modified carbon black, and a combination of oxidized and surface modified carbon black.

5. The self-disperse pigment ink formulation of claim 1, wherein the surface-active compound includes a propoxylated glycerol selected from glycerol propoxylate (Molecular Weight (MW) 1500), glycerol propoxylate (MW 1000) glycerol propoxylate (MW 750), glycerol propoxylate (MW 4100), and combinations thereof.

6. A self-dispersed pigment ink formulation, comprising:
   a self-dispersed black pigment;
   a propoxylated glycerol having the formula:

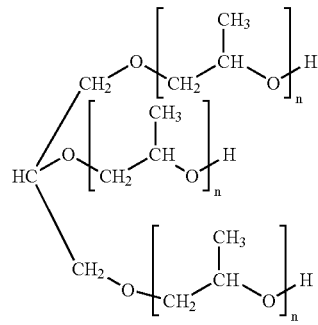

wherein n is from 1 to 40;
   a solvent; and
   an aqueous solution.

7. The self-dispersed pigment ink formulation of claim 6, wherein the self-dispersed pigment is selected from an oxidized carbon black, a surface modified carbon black, and a combination of oxidized and surface modified carbon black.

8. The self-dispersed pigment ink formulation of claim 7, wherein the self-dispersed black pigment is in an amount form about 0.6 to 6 weight percent of the self-dispersed pigment ink formulation; the solvent is in an amount from about 10 to 35 weight percent of the self-dispersed pigment ink formulation; the surface-active compound is in an amount from about 0.01 to 3 weight percent of the self-dispersed pigment ink formulation; the salt is in an amount from about 0.01 to 6 weight percent of the self-dispersed pigment ink formulation; and the aqueous solution is in an about from about 45 to 90 weight percent of the self-dispersed pigment ink formulation.

9. An ink-jet ink set, comprising:
   a color ink formulation, and
   a self dispersed black pigment formulation, comprising:
      a self-dispersed black pigment;
      a surface-active compound having hydrophobic moieties and hydrophilic moieties, wherein the hydrophobic moieties are from about 25 to 75% and the hydrophilic moieties are from about 25 to 75%;
      a solvent; and
      an aqueous solution.

10. The ink-jet ink set of claim 9, wherein the surface-active compound includes a propoxylated glycerol having the formula:

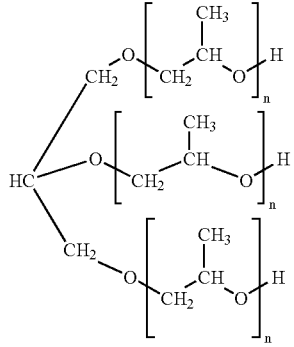

wherein n is from 1 to 40.

11. The ink-jet ink set of claim 9, wherein the self-dispersed black pigment is selected from an oxidized carbon black, a surface modified carbon black, and a combination of oxidized and surface modified carbon black.

12. The ink-jet ink set of claim 9, wherein the color ink is selected from a pigment-based ink, a dye-based ink, and combinations thereof.

13. The ink-jet ink set of claim 9, wherein the surface-active compound is selected from propoxylated fatty acids, propoxylated alchohols, ethoxylated fatty acids, ethoxylated alchohols, alkyl phenols, and combinations thereof.

14. A method of controlling black to color bleed, comprising:
providing a color ink formulation and a self-dispersed black pigment ink formulation, wherein the self-dispersed black pigment ink formulation includes:
a self-dispersed pigment;
a surface-active compound having hydrophobic moieties and hydrophilic moieties, wherein the hydrophobic moieties are from 25 to 75% and the hydrophilic moieties are from 25 to 75%;
a solvent; and
an aqueous solution; and
printing the color ink formulation and the self-dispersed black pigment ink formulation adjacent one another, wherein the bleed from the color ink formulation and the self-dispersed black pigment ink formulation is substantially arrested.

15. The method of claim 14, wherein the surface-active compound includes a propoxylated glycerol having the formula:

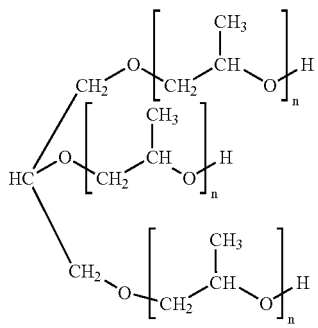

wherein n is from 1 to 200.

16. The method of claim 14, wherein the self-dispersed pigment is selected from an oxidized carbon black, a surface modified carbon black, and a combination of oxidized and surface modified carbon black.

17. A printer system, comprising:
a dispensing system including at least one printhead, wherein the printhead includes at least one of a self-dispersed black pigment and a color ink wherein the self-dispersed black pigment includes:
a self-dispersed black pigment;
a surface-active compound having hydrophobic moieties and hydrophilic moieties, wherein the hydrophobic moieties are from 25 to 75% and the hydrophilic moieties are from 25 to 75%;
a solvent; and
an aqueous solution.

18. The printer system of claim 17, wherein the surface-active compound includes a propoxylated glycerol having the formula:

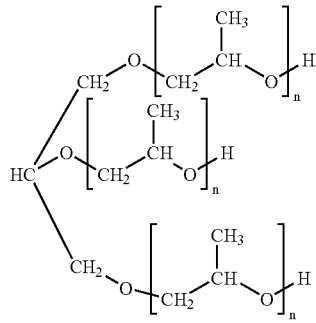

wherein n is from 1 to 40.

19. The printer system of claim 17, wherein the self-dispersed black pigment is selected from an oxidized carbon black, a surface modified carbon black, and a combination of oxidized and surface modified carbon black.

20. The printer system of claim 17, wherein the color ink is selected from a pigment-based ink, a dye-based ink, and combinations thereof.

21. The self-dispersed pigment ink formulation of claim 1, wherein the hydrophobic moieties are from about 45 to 60% and the hydrophilic moieties are from about 40 to 55%.

22. The self-dispersed pigment ink formulation of claim 1, wherein n is from 1 to 40.

* * * * *

UNITED STATES PATENT AND TRADEMARK OFFICE
CERTIFICATE OF CORRECTION

PATENT NO. : 7,416,597 B2
APPLICATION NO. : 10/889751
DATED : August 26, 2008
INVENTOR(S) : Zia Ur Rehman It is certified that error appears in the above-identified patent and that said Letters Patent is hereby corrected as shown below:

In column 5, line 3, before "ethoxylated fatty" delete "alchohols," and insert -- alcohols, --, therefor.

In column 6, line 33, delete "toluene" and insert -- toulene --, therefor.

In column 9, line 45, in Claim 3, delete "form" and insert -- from --, therefor.

In column 9, line 58, in Claim 5, delete "self-disperse" and insert -- self-dispersed --, therefor.

In column 10, line 26, in Claim 8, delete "form" and insert -- from --, therefor.

In column 10, line 33, in Claim 8, delete "about" and insert -- amount --, therefor.

In column 10, line 38, in Claim 9, delete "self dispersed" and insert -- self-dispersed --, therefor.

In column 11, line 8, in Claim 13, delete "alchohols," and insert -- alcohols, --, therefor.

In column 11, line 9, in Claim 13, delete "alchohols," and insert -- alcohols, --, therefor.

In column 12, line 6, in Claim 17, after "ink" insert -- , --.

Signed and Sealed this

Thirteenth Day of July, 2010

David J. Kappos
*Director of the United States Patent and Trademark Office*